(12) United States Patent  (10) Patent No.: US 7,443,386 B2
Gao et al.  (45) Date of Patent: Oct. 28, 2008

(54) MOBILE PHONE AND METHOD

(75) Inventors: Yipu Gao, Beijing (CN); Ying Y. Liu, Beijing (CN); Yanming Zou, Beijing (CN); Kongqiao Wang, Beijing (CN); Jari A. Kangas, Tampere (FI)

(73) Assignee: Nokia Corporation, Espoo (FI)

( * ) Notice: Subject to any disclaimer, the term of this patent is extended or adjusted under 35 U.S.C. 154(b) by 552 days.

(21) Appl. No.: 10/978,954

(22) Filed: Nov. 1, 2004

(65) Prior Publication Data

US 2006/0092128 A1 May 4, 2006

(51) Int. Cl.
*G09G 5/00* (2006.01)
(52) U.S. Cl. .................................. 345/173; 345/179
(58) Field of Classification Search ......... 345/156–157, 345/159–160, 168–169, 171–182, 901–903, 345/947; 178/18.01; 382/177, 185–189
See application file for complete search history.

(56) References Cited

U.S. PATENT DOCUMENTS 6,212,298 B1 * 4/2001 Yoshii et al. ................ 382/193
6,493,464 B1 * 12/2002 Hawkins et al. ............. 382/189
6,647,145 B1 * 11/2003 Gay ........................... 382/187
6,694,056 B1 * 2/2004 Ito et al. ..................... 382/186
6,847,734 B2 * 1/2005 Hamamura ................. 382/229
6,931,153 B2 * 8/2005 Nakao et al. ................ 382/188
2006/0119582 A1 * 6/2006 Ng et al. ..................... 345/168

* cited by examiner

*Primary Examiner*—Richard Hjerpe
*Assistant Examiner*—Mansour M Said
(74) *Attorney, Agent, or Firm*—Perman & Green, LLP

(57) ABSTRACT

A method for inputting characters to a mobile communication apparatus is disclosed. The method comprises the steps of: enabling input of strokes representing a first character in a first area of a touch sensitive display; determining said first character from said strokes; determining one or more candidates of characters for word association with said first character; presenting said one or more candidates on the display; and enabling selection among said one or more candidates. A mobile communication apparatus comprising means for inputting characters is also disclosed.

9 Claims, 3 Drawing Sheets

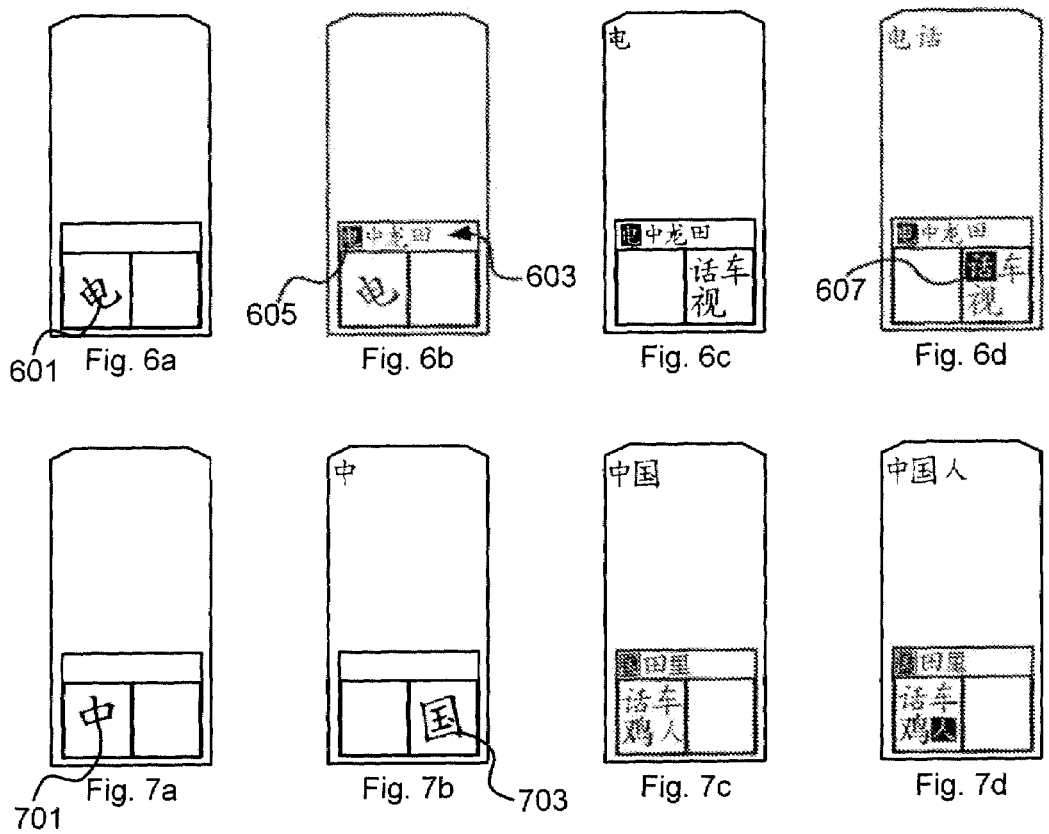
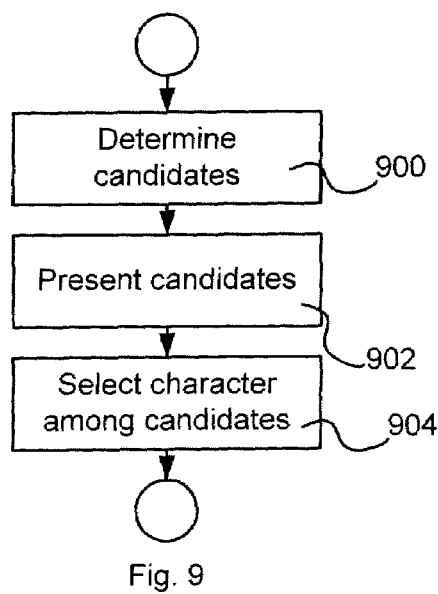

MOBILE PHONE AND METHOD

BACKGROUND OF THE INVENTION

1. Field of the Invention

The present invention relates to a method for inputting characters to a mobile communication apparatus, and such a mobile communication apparatus.

2. Brief Description of Related Developments

There are several ways to input characters in a mobile communication apparatus. In a mobile communication apparatus comprising a touch sensitive display, it is possible to virtually write characters on the screen with a stylus. A processor of the apparatus then interprets the written character, and the interpreted character is input.

The input of information to a mobile communication apparatus by virtually writing on the screen of the mobile communication apparatus is a very feasible way to input information, since most users are familiar with normal writing. However, the interpretation of an input character is not 100% accurate, e.g. due to personal handwriting. Further, some characters may be relatively complex to write, and also complex to interpret. An example of this is some Chinese characters. Therefore, the user desires a facilitated way of inputting information.

SUMMARY OF THE INVENTION

It is therefore an object of the present invention to provide an improved input method and an improved mobile communication apparatus.

The above object is achieved according to a first aspect of the present invention by a method for inputting characters to a mobile communication apparatus, comprising the steps of: enabling input of strokes representing a first character in a first area of a touch sensitive display; determining said first character from said strokes; and detecting if further characters are input within a predetermined time period, and if no further characters are detected within said time period performing the steps of: determining one or more candidates of characters for word association with said first character; presenting said one or more candidates on the display; and enabling selection among said one or more candidates.

An advantage of this is that a user that writes characters fast will be able to do so, until the user do not manage to write fast. Then, the user will get help by the presentation of likely characters to follow. Thus, the user will experience an input method that adapts to the input skills of the user.

A further advantage of this is that computing power is saved when a user do not need help with likely characters to follow.

The input area may comprise a first and a second input area, wherein said input method may comprise the steps of:
enabling input of further characters in said first and second areas alternately; and
enabling correction of a character by inputting a character in the same of said first and second areas as the preceding character. An advantage of this is that the user is enabled to make up her mind, or correct an incorrect input or incorrect interpretation of an input character.

The input of a character may be performed in one of said first and second areas and said presentation of candidates is performed in the other of said first and second areas.

An advantage of this is that space is saved on the display.

An input may be determined to be a stroke if said input is within said input area, and determined to be a selection if said input is outside said input area.

An advantage of this is that it is easily determined by the mobile communication apparatus which kind of input it is, and it is more clear for a user how to choose between writing and selection.

The step of determining said first character from said strokes may comprise the steps of: determining one or more candidates of characters being likely to be said input character; presenting said one or more candidates on the display; and enabling selection among said one or more candidates.

An advantage of this is that the writing is facilitated for the user.

The presenting of candidates of likely characters may be performed in a presentation area of the display, and the selection may be performed by pointing at a character to be selected in said presentation area.

The above object is further achieved according to a second aspect of the present invention by a mobile communication apparatus comprising a touch sensitive display; a receiver structured and arranged to input strokes representing a first character in an input area of said touch sensitive display; a processor structured and adapted to determine said first character from said strokes; a first detector structured and arranged to produce a first signal in dependence on presence of input in said input area; a timer adapted to start every time said first signal switches from indicating presence of input to indicating no input, and time out after a predetermined time; and a second detector structured and adapted to produce a second signal in dependence on if further characters are input before said timer times out, wherein said processor is structured and arranged to, when said second signal indicates no further input character, determine one or more candidates of characters for word association with said first character; present said one or more candidates on the display; and receive a selection among said one or more candidates.

The above object is provided according to a third aspect of the present invention by a computer program arranged to perform the method according to the first aspect of the present invention when downloaded into and run on a mobile communication apparatus.

The advantages of the second and third aspects of the present invention are essentially similar to those of the first aspect of the invention.

BRIEF DESCRIPTION OF THE DRAWINGS

The novel features of the present invention are set forth in the appended claims. The invention itself, however, as well as preferred mode of use, further objects and advantages thereof, will best be understood by reference to the following detailed description of an illustrative embodiment when read in conjunction with the accompanying drawings, wherein:

FIGS. 6a-6d are screen views of an example of input of characters to a mobile communication apparatus;

FIGS. 7a-7d are screen views of further an example of input of characters to a mobile communication apparatus;

FIG. 9 is a flow chart showing an embodiment of determining an input character.

DETAILED DESCRIPTION OF THE PREFERRED EMBODIMENT(S)

Figure 1:
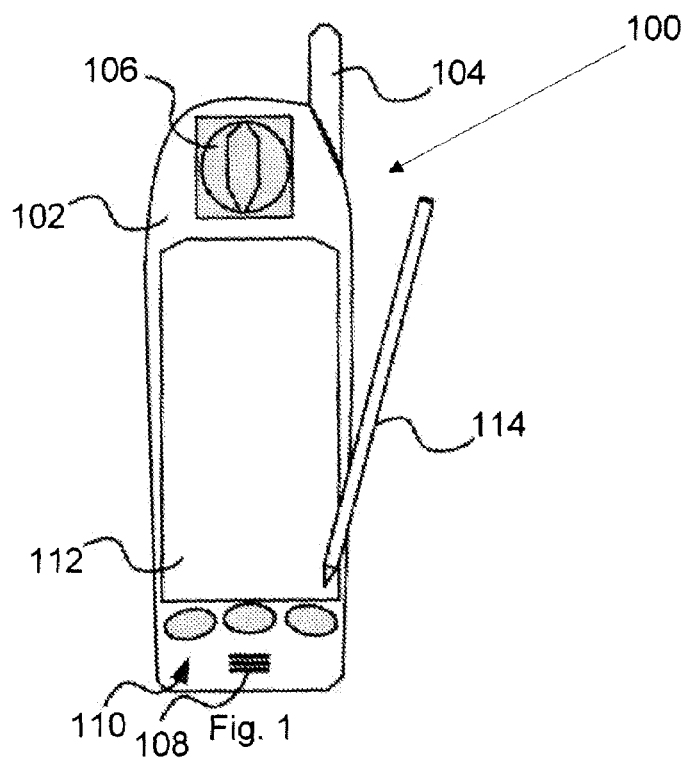
FIG. 1 shows a mobile communication apparatus according to an embodiment of the present invention.

FIG. 1 shows a mobile communication apparatus 100, according to an embodiment of the present invention, comprising a main body 102 on which an antenna 104, a speaker 106, a microphone 108, a plurality of keys 110, and a display screen 112 is present, and a stylus 114 used for input on the screen 112, which is touch sensitive. The stylus 114 can normally be put in a groove (not shown) of the main body 102 when not used. The mobile communication apparatus comprises any features known in the art, such as messaging, browsing, calendar, etc. Further, the mobile communication apparatus comprises functions for input by virtual writing on the touch sensitive screen 112 by the stylus 114. The features of input of the mobile communication apparatus will be described in more detail below.

Figure 2:
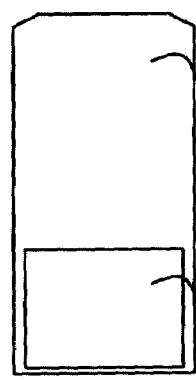
FIG. 2 shows a general display image of a mobile communication apparatus with a touch sensitive display for character input.

To illustrate the basic features of virtual writing on a touch sensitive display, FIG. 2 shows a display image of a display screen 200, with a designated field 202 for input of characters with a stylus. A character is input by a user using the stylus in the field 202 as would have been done with a normal pen on paper. Then, the mobile communication apparatus interprets the character by strokes detected on the touch sensitive display, and preferably displays the character on the screen 200. The user can then input further characters in turn in the field 202, and the interpretation of the characters are displayed in turn as characters on the screen 200.

Figure 3:
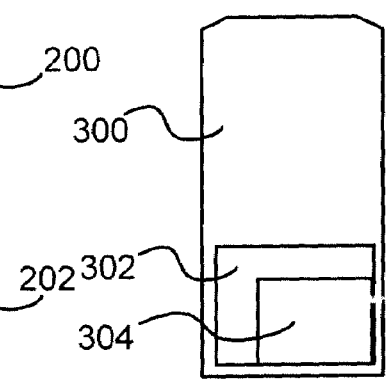
FIG. 3 shows a display image of a display screen according to an embodiment of the present invention.

FIG. 3 shows a display image of a display screen 300 according to an embodiment of the present invention, with a designated first field 302 for input of characters. A second field 304 associated with the first field 302, and preferably placed within the first field 302, is designated for selection of alternatives presented in connection with the input. The second field can be placed in the lower right corner, as depicted in FIG. 3, as a character in e.g. Chinese normally begin with a stroke up to down or left to right. For other types of characters, and their way of being written, the second field 304 can be properly placed within the first field 302. The placing of the second field 304 within the first field 302 is due to the normally limited available space on a screen of a mobile communication apparatus. However, if this is not a constraint, the fields 302, 304 can be placed arbitrarily.

When the first pen-down is detected in the first field 302, but out of the second field 304, a character input by strokes should be interpreted. When an input character is recognized, the character is displayed on the screen and characters associated with the recognized character are displayed in the second field 304. Associated characters can be characters forming a word together with the first input character. If the next pen-down is within the second field 304, a character of the displayed associated characters at the pen-down point is selected accordingly, and displayed together with the character inputted by virtual writing. If the next pen-down is in the first field 302, but out of the second field 304, a second character input by strokes should be interpreted, and displayed on the screen, e.g. in a text editor, next to the preceding input character. Thereby, the user is able to continue virtual writing until the user wants to use the feature of selecting among the associated characters. To save computing power, or simply not disturbing the user, a predetermined, and preferably user selectable, delay can be applied before associated characters are determined and displayed. The user selectable delay can be anything from no delay to infinity, i.e. the function is disabled. It is feasible that after an associated character is selected, further associated characters can be presented for further selection. The further associated characters can be characters forming a word with the preceding characters input by virtual writing and selection.

Figure 4A:
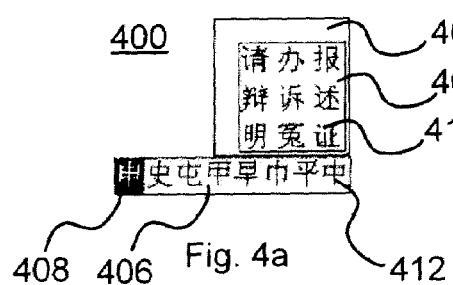
FIGS. 4a and 4b illustrates a part of a screen view according to an embodiment of the present invention.
Figure 4B:
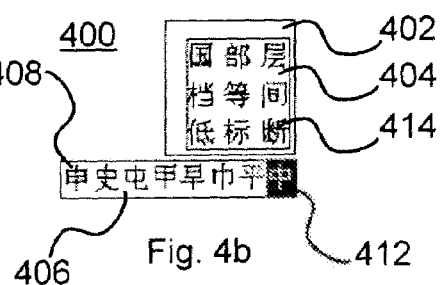

The interpretation of the character input by virtual writing is not 100% accurate. Therefore it is preferable that two or more likely recognized characters are presented to the user, with the most likely as a default. Associated characters displayed in the second field 304 are thus associated with the default character. If another character than the default character is selected among the most likely characters, a new set of associated characters are presented, being associated with the selected character. FIGS. 4a and 4b illustrates a part of a screen view 400 comprising first and second fields 402, 404. The view further comprises a third field 406, which presents a plurality of likely characters inputted by virtual writing. A default character 408 is marked in FIG. 4a as being the most likely. Field 404 in FIG. 4a presents a set 410 of associated characters to the marked default character 408. The user may find that the character she intended to input is another among the presented likely characters. The user can then select, e.g. by tapping with the stylus on the correct character 412 in the third field 408. The correct character then becomes marked, as depicted in FIG. 4b. A new set 414 of associated characters, associated with the correct character 412, is presented in the second field 404, as depicted in FIG. 4b. The user is then able to select among the characters associated to the character she really intended to input.

Figure 5:
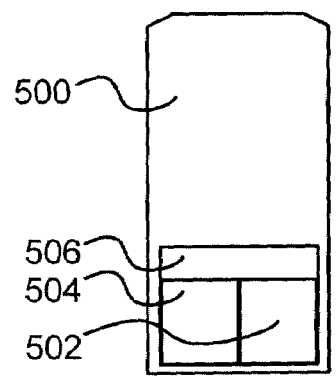
FIG. 5 shows a display image of a display screen according to further an embodiment of the present invention.

FIG. 5 shows a display image of a display screen 500 according to a further embodiment of the present invention, with designated first and second fields 502, 504 for input of characters. A third field 506 associated with the first and second fields 502, 504 is designated for selection of alternatives presented in connection with the input. The use of the fields 502, 504, 506 will be illustratively described by examples in FIGS. 6a-6d and 7a-7d.

FIGS. 6a-6d are screen views of an example of input of characters to a mobile communication apparatus having a touch sensitive display by virtual writing by a stylus, using input fields similar to what presented in FIG. 5.

In FIG. 6a, a user writes a character 601 in the first field. The writing is interpreted and in FIG. 6b, a plurality of likely characters 603 are presented in the third field, with the most likely character 605 marked as a default character. The user recognizes the character 605 as the correct character and in FIG. 6c, the correct character 605 is presented on the screen, e.g. for a text editing application or a messaging application. The default character is either presented directly, or after a delay, or upon selection by the user. In FIG. 6c, a plurality of associated characters are presented in the second field. Associated characters are characters likely to follow a preceding character, and can e.g. form a word with the preceding character. In FIG. 6d, the user selects one of the characters presented in the second field, and the selected character 607 is inserted in the presented text on the display.

FIGS. 7a-7d are screen views of a further example of input of characters to a mobile communication apparatus having a touch sensitive display by virtual writing by a stylus, using input fields similar to what presented in FIG. 5.

In FIG. 7a, a user writes a first character 701 in the first field. The user is a skilled writer, and immediately writes a second character 703 in the second field, as depicted in FIG. 7b. The first character 701 is then immediately presented in the text on the display, as being an accepted default character.

The user then do not immediately write a third character in the first field, as would be possible for the fast writing user. Instead, the likely characters are presented in the third field, with the most likely character marked as a default character. The user recognizes the marked character as the correct character and in FIG. 7c, the correct character is presented on the screen, e.g. for a text editing application or a messaging application. Further, in FIG. 7c, a plurality of associated characters are presented in the first field. In FIG. 7d, the user selects one of the characters presented in the first field, and the selected character is inserted in the presented text on the display. In this way, the user is able to write fast by alternately writing in the first field and the second field. When the user need or want help, suggestions on likely associated characters turn up in the one of the first and second fields that was not used for input.

To save computing power, or simply not disturbing the user, a predetermined, and preferably user selectable, delay can be applied before associated characters are determined and displayed. Thus, the fast writer can go on writing in the alternate fields, and the mobile communication apparatus do not attempt to help the user until it seems to be needed. The user selectable delay can be anything from no delay to infinity, i.e. the function is disabled. A normal delay set by a normal user is between a fraction of a second and a second. It is feasible that after an associated character is selected, further associated characters can be presented, preferably alternately between the first and second fields, for further selection. The further associated characters can be characters forming a word with the preceding characters input by virtual writing and selection.

The delay can be implemented by a timer starting every time no touch is detected on the display, stops when touch is detected, and re-starts next time no touch is detected. The disabling is present as long as the timer has not timed out the predetermined time.

Figure 8:
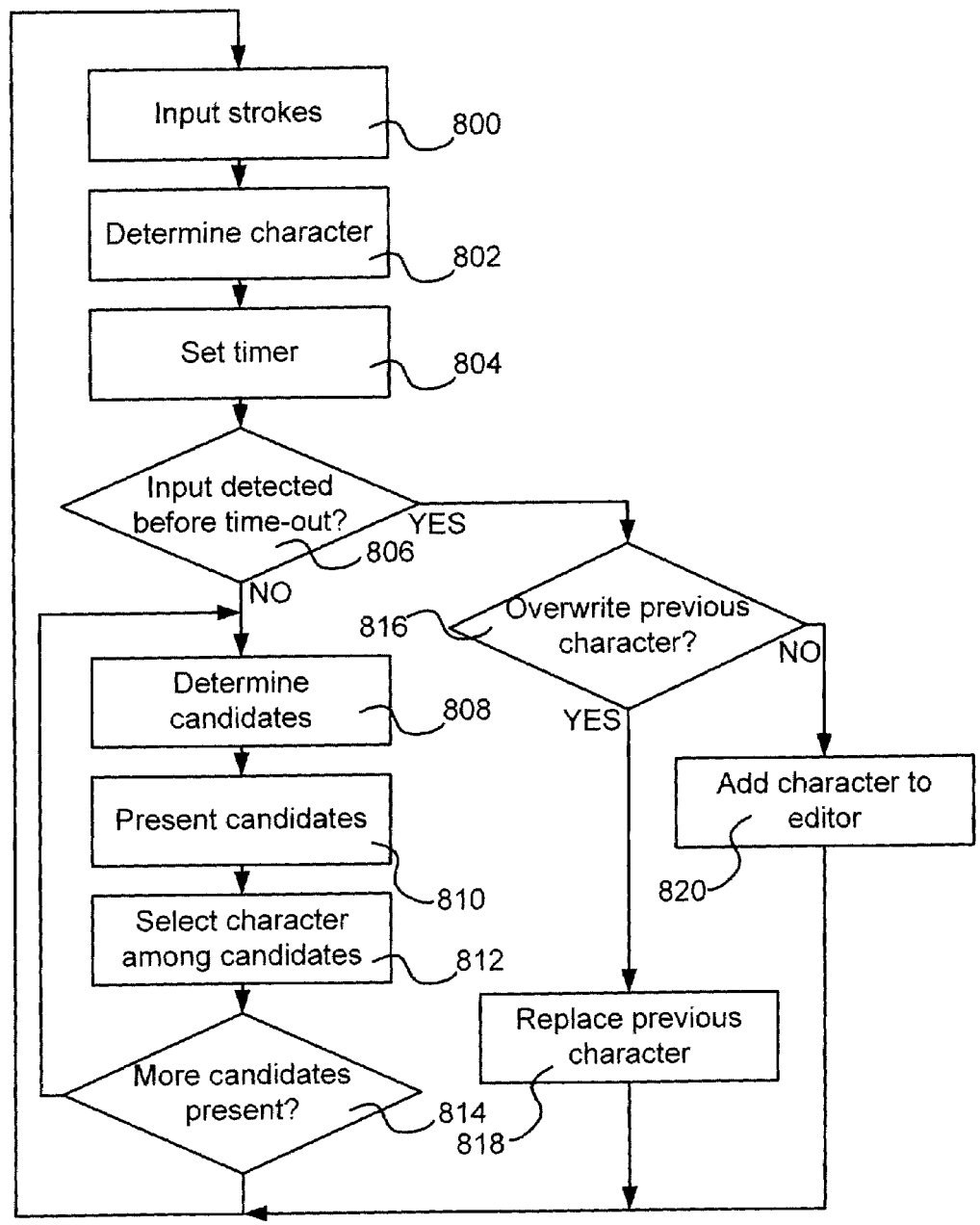
FIG. 8 is a flow chart showing a method according to an embodiment of the present invention.

FIG. 8 is a flow chart showing a method according to an embodiment of the present invention. In a stroke input step 800, input strokes performed by virtual writing by a stylus on a touch sensitive display screen are received and gathered by a processor of the mobile communication apparatus. A character likely to correspond with the input strokes is determined in a character determination step 802. As described above with reference to FIGS. 4, 6a-6d and 7a-7d, this step can also comprise presenting a plurality of likely characters, among one is selected. In a timer setting step 804, a timer is set and started, preferably starting after the last stroke is input, as described above. In a determination step 806 of new input strokes, it is determined if new input of strokes is present before the timer times out. If no new input is determined within the predetermined time-out period, candidates of characters associated with the previously input character are determined in a candidate determination step 808. For example, the associated characters can form a word association with the previously input character. The candidates can also be determined before or in parallel with the input determination step 806, as the candidate determination step 808 will require some processing. In case the candidate determination step is performed before or in parallel with the input determination step 806, the result of candidate determination is achieved earlier, but on the other hand, processing power may have been wasted in vain if the user do not need help from the determined candidates. The candidates are presented in a candidate presentation step 810. A character among the candidates is selected in a character selection step 812. As characters are input and selected, they are used in an application in the mobile communication apparatus, e.g. a messaging application. Based on previously input and selected characters further characters can be associated to e.g. form a word. In a determination step 814 for further associated characters with the previous characters, it is determined whether more candidates are present. If more candidates are present the method continues with candidate determination step 808, otherwise, the method continues with stroke input step 800.

Returning to determination step 806 of new input strokes, if it is determined that new input of strokes is present before the timer times out, the method branches off to a determination step 816 of overwriting previous character. Overwriting can be determined by determining in which field the new input strokes are present. For example, if a first character is input in the first field, according to FIG. 5, and then a second character is input in the second field, overwriting should not be performed. If a first character is input in the first field and then a second character is input in the first field, the first character should be replaced by the second character, i.e. overwriting is present. Other ways of determining overwriting are possible to provide a feasible input method. If overwriting is determined, it is set in a replacement step 818 that the new input character should replace the previous character, and then the method continues to the stroke input step 800. Otherwise, if no overwriting is determined in determination step 816, the method continues to a step 820 for addition of characters to e.g. an editor, and then returns to the stroke input step 800.

It should be noted that the nature of the technology, and thus also the method, is that real-time constraints are rather strict to provide a feasible user interface. Thus is the sequential description of the method more or less only for descriptive purposes. In practice, the steps are performed in any order, in different orders from time to time, and sometimes performed in parallel, with the only demand that there is required data available for the step to work with. Further, the method is running as long as the operation of input of characters is running.

FIG. 9 is a flow chart showing an embodiment of determining an input character, as of the character determination step 802 in FIG. 8. Candidates likely to be a character input by strokes are determined in a candidate determination step 900. The determined candidates are then presented in a candidate presentation step 902. The candidates can be presented on the screen, as illustrated in FIGS. 4a, 4b, 6b-6d, 7c or 7d, or any other way to achieve a feasible user interface. A character among the likely candidates is then enabled to be selected in a character selection step 904, which character thereby is determined to be the input character.

The invention claimed is:

1. A method for inputting characters to a mobile communication apparatus, comprising:
    enabling input of strokes representing a first character in an input area of a touch sensitive display, wherein said input area comprises a first input area and a second input area;
    determining said first character from said strokes; and
    detecting if further characters are input within a predetermined time period, and if no further characters are detected within said time period performing the steps of:
    determining one or more candidates of characters for word association with said first character;
    presenting said one or more candidates on the display; and
    enabling selection among said one or more candidates; and
    wherein
    characters can be inputted in said first and second areas alternately and character correction can be enabled by inputting a character in the same of said first and second input areas as the preceding character, and where said input of a character is performed in either the first input area or the second input area and said presentation of candidates is performed in the first input area or second input area not being used.

2. The method according to claim 1, wherein an input is determined to be a stroke if said input is within said input area, and determined to be a selection if said input is outside said input area.

3. The method according to claim 1, wherein said step of determining said first character from said strokes comprises the steps of:
   determining one or more candidates of characters being likely to be said input character;
   presenting said one or more candidates on the display; and
   enabling selection among said one or more candidates.

4. The method according to claim 3, wherein said presentating of candidates of likely characters is performed in a presentation area of the display, and wherein said selection is performed by pointing at a character to be selected in said presentation area.

5. A computer program arranged to perform the method according to claim 3 when downloaded into and run on a mobile communication apparatus.

6. A computer program arranged to perform the method according to claim 1 when downloaded into and run on a mobile communication apparatus.

7. A mobile communication apparatus comprising
   a touch sensitive display; and
   a receiver structured and arranged to input strokes representing a first character in an input area of said touch sensitive display;
   a processor structured and adapted to determine said first character from said strokes;
   a first detector structured and arranged to produce a first signal in dependence on presence of input in said input area;
   a timer adapted to start every time said first signal switches from indicating presence of input to indicating no input, and time out after a predetermined time; and
   a second detector structured and adapted to produce a second signal in dependence on if further characters are input before said timer times out,
   wherein said processor is structured and arranged to, when said second signal indicates no further input character, determine one or more candidates of characters for word association with said first character; present said one or more candidates on the display; and receive a selection among said one or more candidates.

8. The mobile communication apparatus of claim 7 wherein the processor is further configured to arrange the input area into a first input area and a second input area, and enable the input of characters in the first and second areas alternately, and enable correction of a character by inputting a character in the same of the first and second areas as the preceding character.

9. The apparatus of claim 7 wherein the processor is further configured to arrange the input area into a first input area and a second input area and the input of a character is performed in either the first input area or the second input area and the presentation of candidates is performed in the first input area or the second input area.

* * * * *